(12) United States Patent
Ouzounov (10) Patent No.: US 9,973,284 B2
(45) Date of Patent: May 15, 2018

(54) COMMUNICATION DEVICE AND SYSTEM FOR PERFORMING DATA COMMUNICATION USING A HUMAN OR ANIMAL BODY AS TRANSMISSION MEDIUM

(71) Applicant: KONINKLIJKE PHILIPS N.V., Eindhoven (NL)

(72) Inventor: Sotir Filipov Ouzounov, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/511,434

(22) PCT Filed: Sep. 15, 2015

(86) PCT No.: PCT/EP2015/070993
§ 371 (c)(1),
(2) Date: Mar. 15, 2017

(87) PCT Pub. No.: WO2016/050497
PCT Pub. Date: Apr. 7, 2016

(65) Prior Publication Data
US 2017/0244495 A1    Aug. 24, 2017

(30) Foreign Application Priority Data

Sep. 29, 2014    (EP) .................................... 14186741

(51) Int. Cl.
*H04B 13/00*    (2006.01)
*H04B 1/38*    (2015.01)
(Continued)

(52) U.S. Cl.
CPC ....... *H04B 13/005* (2013.01); *G06F 13/4072* (2013.01); *H04B 1/385* (2013.01);
(Continued)

(58) Field of Classification Search
CPC ............................ H04B 13/005; H04B 11/00
See application file for complete search history.

(56) References Cited

U.S. PATENT DOCUMENTS 7,646,133 B2    1/2010  Degertekin
9,662,679 B2 *  5/2017  Chen ..................... B06B 1/0292
(Continued)

FOREIGN PATENT DOCUMENTS

WO        WO0115771 A2       3/2001
WO    WO2004093486 A2      10/2004
(Continued)

OTHER PUBLICATIONS

Webster, J. G., & Eren, H. (2014). Measurement, Instrumentation, and Sensors Handbook, Second Edition Spatial, Mechanical, Thermal, and Radiation Measurement., pp. 29-4 and 29-5.*
(Continued)

*Primary Examiner* — Ross Varndell
(74) *Attorney, Agent, or Firm* — Larry Liberchuk (57) ABSTRACT

The invention is directed at a communication device for performing data communication using a human or animal body as transmission medium. The communication device comprises a transceiver unit comprising at least one of a transmitter and a receiver. The communication device also comprises an electrostatic transducer for enabling data communication via a surface of the body with one or more user devices in touch with or located near (i.e. in close proximity, e.g. within a range of 0-10 mm therefrom) the body. The communication device further comprises an ultrasonic transducer for enabling data communication through the body using ultrasonic waves. Both the electrostatic transducer and the ultrasonic transducer are capacitive type transducers connected to and operated via the transceiver unit.

13 Claims, 4 Drawing Sheets

(51) Int. Cl.
*G06F 13/40* (2006.01)
*H04B 1/3827* (2015.01)
*H04W 52/52* (2009.01)

(52) U.S. Cl.
CPC .......... *H04W 52/52* (2013.01); *Y02B 60/1228* (2013.01); *Y02B 60/1235* (2013.01)

(56) References Cited

U.S. PATENT DOCUMENTS

| | | | |
|---|---|---|---|
| 2004/0202339 A1* | 10/2004 | O'Brien, Jr. | H04B 13/005 381/312 |
| 2010/0204758 A1 | 8/2010 | Boon | |
| 2010/0298669 A1 | 11/2010 | Ida | |
| 2011/0200150 A1* | 8/2011 | Fazzi | H04B 13/005 375/343 |
| 2012/0299540 A1* | 11/2012 | Perry | H04B 11/00 320/108 |
| 2013/0073000 A1 | 3/2013 | Chavan | |
| 2013/0197920 A1* | 8/2013 | Lesso | H04L 25/4902 704/500 |
| 2016/0374703 A1* | 12/2016 | Yu | A61B 17/2202 606/128 |

FOREIGN PATENT DOCUMENTS

| | | |
|---|---|---|
| WO | WO2010049842 A1 | 5/2010 |
| WO | WO2014177412 A1 | 11/2014 |
| WO | WO2016037912 A1 | 3/2016 |

OTHER PUBLICATIONS

Yilmaz T. et al., "Detecting Vital Signs with WearableWireless Sensors", Sensors 2010, 10, 10837-10862; doi:10.3390/s101210837.

* cited by examiner

COMMUNICATION DEVICE AND SYSTEM FOR PERFORMING DATA COMMUNICATION USING A HUMAN OR ANIMAL BODY AS TRANSMISSION MEDIUM

FIELD OF THE INVENTION

The present invention is directed at a communication device for performing data communication using a human or animal body as transmission medium, the communication device comprising a transceiver unit comprising at least one of a transmitter and a receiver, and wherein the communication device comprises an electrostatic transducer for enabling data communication via a surface of the body with one or more user devices in touch with or near the body. The invention is further directed at a system of communications devices arranged for intercommunication between said communication devices via data communication using a human or animal body as transmission medium.

BACKGROUND

With the increasing number and functionality of implantable and wearable devices, the need increases for a reliable high-throughput and safe communication in and around the body. There are several technological options that can serve this need, and their suitability is judged by the properties of the communication channel (the human body) for the respective types of signals, the required size of the implementation and the achievable power-to-performance ratio. Further, for each type of signal there are safety limits for the signal amplitudes and duty cycles to prevent damage to the body for short and long term usage.

For medical applications, data communication methods exist that use the human body as transmission medium to communicate between devices worn on or near the human body. This for example enables the transmission of local sensor data obtained from a specific locality on the body of a patient to a central receiver device gathering these signals. Of course, many other applications of such communications methods are possible. Generally, such a communication network using the body as transmission medium may be referred to as a body area network (BAN). More recently, such methods has evolved into a new type of communication called body coupled communication (BCC) which allows data communication at very frequencies (HF) of up to 100 MHz.

In BCC type data communication, data signals are transmitted via the surface (i.e. skin) of the body. Enabling the use of HF carrier frequencies, this type of communication potentially obtains high data rates rendering this type of communication suitable for data communication between many kinds of wearable devices. However, in some situations (e.g. for medical purposes), it may also be desired to allow data communication with devices inside the body. Examples of this are data communication with a pacemaker to obtain operational feedback, or obtaining data from a wireless probe brought inside the body during a medical examination. Neither BCC type communication nor radio wave type communication are suitable for this task, as signals are only conveyed across the surface of the body (BCC) or in the air and cannot penetrate inside the body for communication purposes.

At present, there are no good solutions available that allow 'body bound' data communication between devices regardless of whether such devices are located on, near or inside the body. Due to the different nature of communication types suitable for reaching devices at various locations, different types of communication systems are to be relied upon in different situations.

The document US2004/202339 describes a technique of connecting a hearing aid to another device via the body of the person wearing the devices. It describes the use of ultrasound or wireless communications.

SUMMARY OF THE INVENTION

It is an object of the present invention to provide a communications device suitable for enabling data communication with other devices that are located either inside, on or near a human or animal body. Moreover, there is a need for enabling such communication in a cost effective and energy efficient manner.

To this end, there is provided herewith a communication device for performing data communication using a human or animal body as transmission medium. The communication device comprises a transceiver unit comprising at least one of a transmitter and a receiver. The communication device also comprises an electrostatic transducer for enabling data communication via a surface of the body with one or more user devices in touch with or located near (i.e. in close proximity, e.g. within a range of 0-10 mm therefrom) the body. The communication device further comprises an ultrasonic transducer for enabling data communication through the body using ultrasonic waves. Both the electrostatic transducer and the ultrasonic transducer are capacitive type transducers connected to and operated via the transceiver unit. Hence, a same transceiver unit is shared by both the electrostatic transducer and the ultrasonic transducer.

By sharing the transceiver unit between the both types of transducers, efficient power consumption can be obtained whilst at the same time allowing an elegant and more simple design (only one transceiver is needed to operate both transducers). The simplified design enables the communication device to be produced at low cost, thereby increasing its usability in all kinds of appliances. Moreover, the device can be smaller, which further increases it's usability.

The ultrasonic communication offers the best signal propagation for smallest form factor and energy consumption inside the body, while body-coupled communication is very power efficient and user-friendly for on-body and touch communication. At the edge of two different mediums (body surface and body interior) the properties of the communication channel change dramatically (e.g. from water to air). Conventionally, this makes the propagation of one and the same type of signal impossible or impractical. However, in the present design use is made of transducers that convert the electric signals into signals that propagate optimally in the designated medium, e.g. ultrasonic for in-body and electrostatic for on-body.

In particular, in accordance with the present invention, the ultrasonic and electrostatic transducers applied are of capacitive type and therefore have similar properties in terms of operation frequency and signal type. The transducers can therefore be operated via the same transceiver, thereby allowing a design wherein the transceiver unit is shared. For both the electrostatic transducer (e.g. of body coupled communication type) and the ultrasonic transducer, the same communication protocols can be applied. This enables to build a unified communication network that goes in and out of body based on the communication device of the present invention. Communication may therefore be performed faster and more efficient, and because of the integration of both types of transducers into one device with a (at least one) shared transceiver the area of application of the technology is increased. The need for only a single transceiver, i.e. in a half duplex embodiment, for example provides an important size reduction compared to an implementation relying on two different transceivers (one for each type of signal and associated protocols). Hence, both technologies are easily integrated into a single device (e.g. a wearable user device or a medical appliance) as a result of the present invention.

In accordance with an embodiment, the transceiver unit is arranged for communication at a radio frequency within a frequency bandwidth of 100 kHz to 30 MHz, preferably 100 kHz to 10 MHz, and more preferable 1 MHz to 10 MHz. The optimal ultrasonic transmission characteristics of the body lay in the frequency range of about 100 kHz up to about 10 MHz. Communication with lower ultrasonic frequencies will suffer from poor spatial resolution or increased size of the transducers. At higher frequencies the attenuation of the signals increases and thus the maximum communication distance that can be achieved with low power devices decreases. Similarly, for body coupled signals the optimal frequency of propagation is above 100 kHz and below 30 MHz. For low frequencies the spectrum is typically heavily polluted with noise and interference, while above 30 MHz the body length approaches the wavelengths of the signals and the body starts to act as an antenna. Therefore, both transducers would optimally be operable within the above-mentioned frequency ranges of the embodiments identified. This frequency match is particularly interesting for the optimization of the dual modality communication. Together with the fact that both transducers of the device of present invention are capacitive type transducers, the electronics and applied communication protocols can be the same, except for some impedance matching and biasing to be applied in the transducers themselves. Outside the given frequency ranges, the invention may still work to a certain extend although some additional adaptation may be required to compensate for attenuation, lower spatial resolution, or noise. Thus, the ranges indicated are not essential to the invention, although they are preferred in view of the additional advantages.

Therefore, in accordance with a further embodiment, each one of the electrostatic transducer and the ultrasonic transducer comprises driver electronics, said driver electronics being arranged for at least one of impedance matching and biasing of each respective transducer. Additionally, the driver electronics may be equipped to optimize other operational parameters of each transducer, dependent on the situation. It has been observed that efficiently, at least impedance matching and applied bias voltage are different for both transducers and may therefore be performed by the driver electronics comprised by each transducer. For example, to operate in collapse mode, the capacitive ultrasonic transducer may be biased with a DC voltage of 100 Volt.

In accordance with yet a further embodiment, the ultrasonic transducer comprises an capacitive micromachined ultrasonic transducer (CMUT). A capacitive micromachined ultrasonic transducer can be easily integrated together with capacitive couplers into a single communication device, because both type of transducers have similar properties in terms of capacitance and desired bandwidth of operation. As will be appreciated, the capacitive couplers are applied as the electrostatic transducers for enabling body coupled communication (BCC) in embodiments of the present invention.

A CMUT usually consists of a cavity formed in a silicon substrate. The silicon substrate is supported by a bottom electrode, and the membrane itself, or a metalized layer on top of the membrane acts as a top electrode. The configuration as a whole formed a capacitance. Application of an alternating current (AC) signal across the electrodes causes the membrane to vibrate and to produce ultrasonic waves.

The wavelength of the ultrasonic waves produced is dependent on the size and tension of the membrane. In case the CMUT is operated on collapse mode, the element is biased with a high enough DC voltage (e.g. as indicated above) such that the center part of the membrane contacts the bottom electrode (or substrate) and only a circumferential ring around the center of the membrane produces the ultrasonic waves. As a result, the obtainable frequencies are higher and the transmission characteristics of the element are different.

Therefore, in accordance with yet a further embodiment, the driver electronics of the ultrasonic transducer is arranged for applying a direct current biasing voltage to the ultrasonic transducer for operating the transducer in collapse mode. In principle, it is not essential that the CMUT is operated in collapse mode, however the higher resonant frequencies of the CMUT and the higher generated acoustic power are advantageous in obtaining correct operation of a communication link with another communication device. If the CMUT operates in normal mode (not collapsed), these resonant frequencies are lower, as will be the signal power. This, of course, is electronically compensable but it may be appreciated that for this reason operation in collapse mode is advantageous in many embodiments.

In accordance with yet a further embodiment of the present invention, the transceiver unit comprises at least one of an encoder cooperating with the transmitter or a decoder cooperating with the receiver, wherein said at least one of said encoder or decoder is arranged for encoding or decoding data in accordance with a DC-free encoding method. In particular, in accordance with yet a further embodiment the encoder or decoder is arranged for encoding or decoding data in accordance with a coding method which is an element of a group comprising: Manchester coding method, and bipolar coding, such as high density bipolar coding. Manchester encoding is a DC-free type of encoding method (hence the polarity of signal states (high/low) this imbalance such as to prevent build up of a DC component). Moreover, Manchester encoding is a self clocking encoding method, allowing synchronization by the receiver of the data communication signal to be performed based on the signal itself. The advantage of using a DC-free encoding method is that it addresses the capacitive nature of the antenna. In particular, in absence of the build up of a DC component, the behavior of the transmitter and the receiver is constant during operation and no further compensation is required in the driver electronics.

The receiver unit in the transceiver of the communication device may further comprise a low noise amplifier to account for the low peak-peak voltage in the received signal of the CMUT and the electrostatic capacitive coupler. In particular for the CMUT the received signal will typically be a few tens of mV peak-peak (e.g. 10-90 mV), and a low noise amplifier may be advantageous for improving the signal-to-noise ratio (SNR). Timing generator, clock recovery, data correlation and decoding, as well as the optional use of a low noise amplifier as indicated in the present embodiment, may be shared and integrated in the shared transceiver electronics.

In accordance with a further embodiment of the present invention, the electrostatic transducer comprises one or more capacitive couplers for enabling data communication using body coupled communication protocol. As already mentioned above, the application of body coupled communication enables operation in a same frequency bandwidth as the ultrasonic transducer. Moreover, BCC can be applied using electrostatic transducers having similar capacitive properties as the ultrasonic transducers, which is beneficial to the present invention.

In accordance with a further embodiment of the present invention, the communication device comprises multiple transceiver units, wherein each transceiver unit is connected to each one of said ultrasonic transducer and said electrostatic transducer for enabling simultaneous communication via multiple communication channels, the number of simultaneous communication channels being smaller than or equal to the number of transceiver units. In an embodiment wherein only a single transceiver unit is applied, a possible mode of communication is half duplex. The same data signal can be send through either one or both of the ultrasonic transducer and the electrostatic transducer simultaneously. Transmission of different (i.e. non-identical) data signals with a single transmitter would require multiplexing in time to allow transmission in different time slots. On the reception side, the receiver locks to a transmitter and can thus only receive one signal at a time. Reception of multiple different data signals simultaneously requires multiple receivers. In order to allow full duplex communication of multiple data signals via either one of the transducers in absence of multiplexing, at least two transceivers are necessary such as to generate and process the transmitted and received signals simultaneously.

In accordance with other embodiments of the present invention, the transceiver unit comprises at least one element of a group comprising: multiple receivers, multiple transmitters, and a multiplexer unit.

In accordance with a second aspect of the present invention there is provided an apparatus comprising a plurality of communication devices in accordance with any of the previous claims.

Yet in accordance with a third aspect of the present invention there is provided a system of communications devices arranged for intercommunication between said communication devices via data communication using a human or animal body as transmission medium, wherein the communication devices include or are comprised by at least one of a group comprising wearable devices, portable devices, and implantable devices suitable for implantation in a human or animal body.

In accordance with a fourth aspect, there is provided a method of performing data communication between a plurality of devices using a human or animal body as transmission medium, wherein at least one first device of the plurality of devices is located inside said human or animal body, and wherein at least one second device of the plurality of devices is located on or in proximity of said human or animal body, wherein the method comprises using a communication device in touch with said body for performing said data communication between the plurality of devices, the method comprising the steps of: generating, using a transmitter in a transceiver unit of the communication device, a data signal; and transmitting, using at least one of a plurality of transducers of the communication device, the data signal to at least one of said first device or said second device; wherein the plurality of transducers comprise an electrostatic transducer and an ultrasonic transducer, wherein the method further comprises selecting, by a controller of the communication device, either one or all of the transducers for transmitting the data signal, wherein said electrostatic transducer is selected when the data signal is to be transmitted to the at least one second device, and wherein said ultrasonic transducer is selected when the data signal is to be transmitted the at least one first device; and wherein both the electrostatic transducer and the ultrasonic transducer are capacitive type transducers that are operated via said same transceiver unit. The communication device could be a separate device or could be included as part of any of the plurality of devices, e.g. as an integrated communication unit therein. As may be appreciated, the transducers are in touch with the body to allow transmission, e.g. the ultrasonic transducer is in touch with the body.

In accordance with an embodiment, the transceiver unit of the communication device further comprises at least one receiver to which each one of said electrostatic transducer and said ultrasonic transducer are connected, wherein the method further comprises: receiving a data signal via either one or both of the electrostatic transducer or the ultrasonic transducer; and processing the data signal using the at least one receiver for obtaining data conveyed by the data signal.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
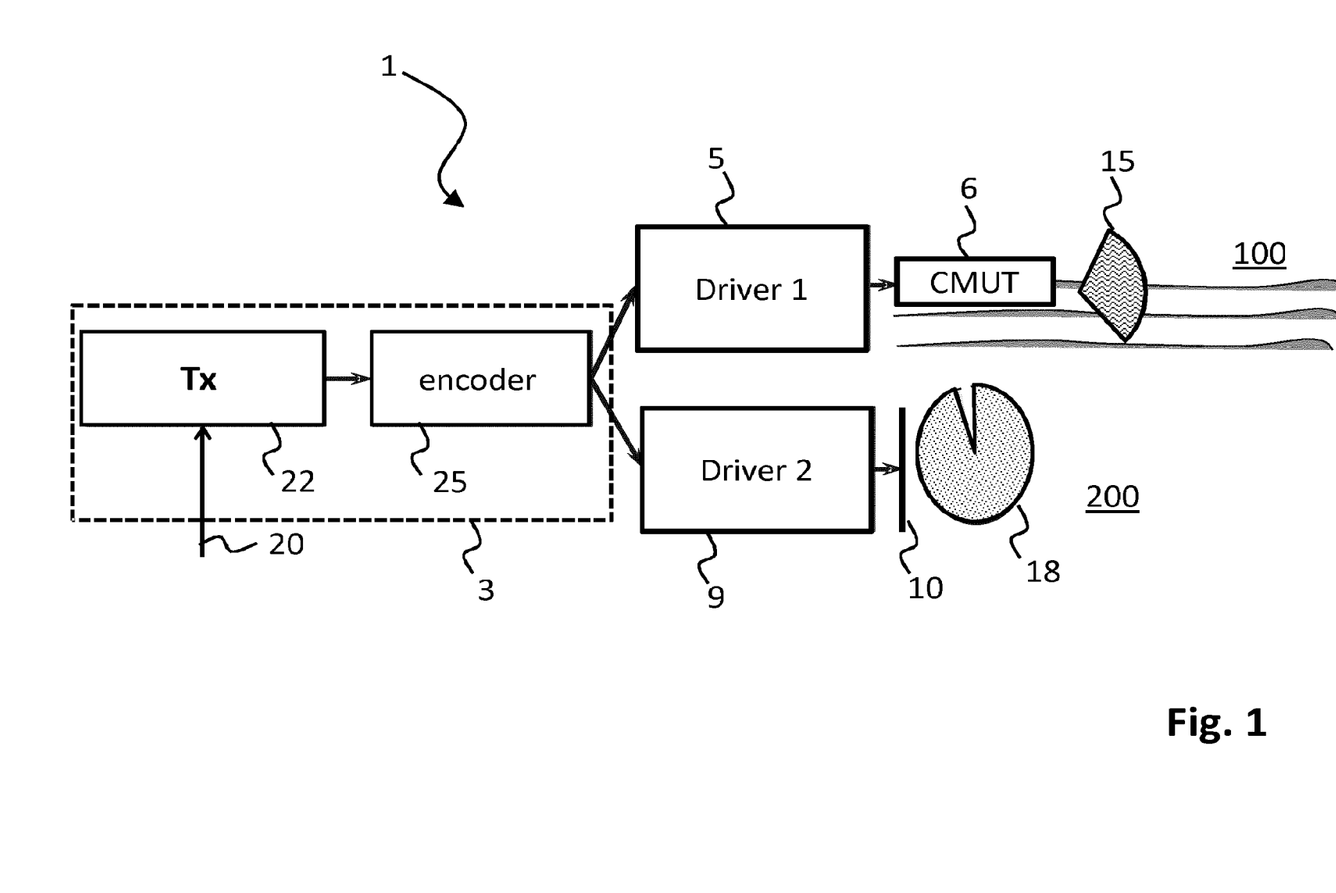
FIG. 1 is a schematic illustration of a communication device of the present invention, illustrating a layout for transmission of signals.
Figure 2:
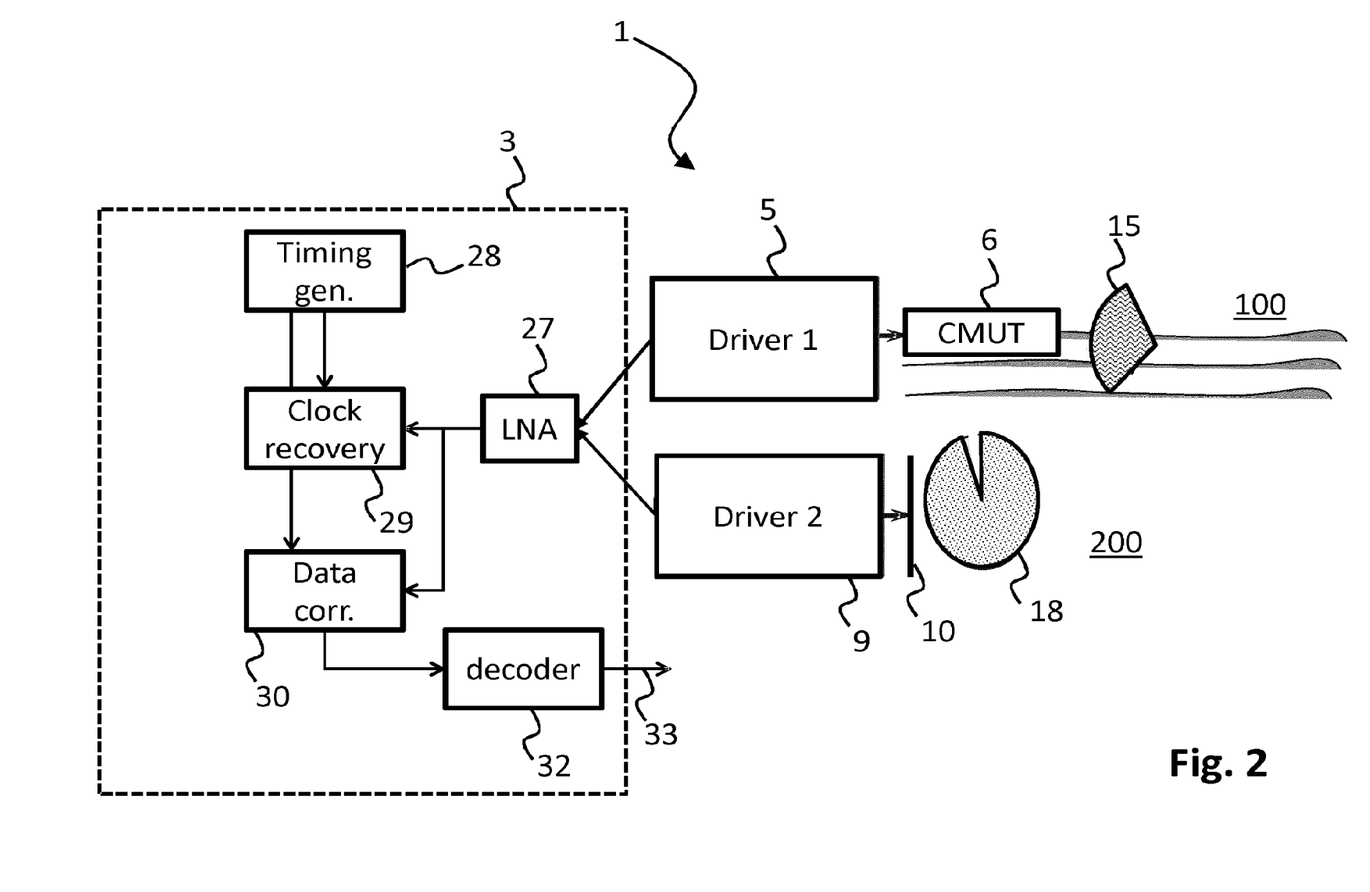
FIG. 2 is a schematic illustration of a communication device of the present invention, illustrating a layout for receipt of signals.

FIGS. 1 and 2 illustrate a communication device of the present invention, in particular a possible layout for transmission of signals (FIG. 1) and for receipt of signals (FIG. 2). FIG. 1 provides a block diagram which describes the main components of the transmitting side of a dual-modality communication system 1 of the present invention. Transmitter 22 may receive control signals via the input 20 of the transceiver unit 3, and may generate data for transmission in response to such control signals. The data generated by the transmitter logic 22 is first encoded by the data encoder 25. The encoder 25 for example may use Manchester encoding in order to address the capacitive nature of the transducers 6 and 10. However, another type of DC free encoding could also be used instead. The encoded transmission signal is provided to two modality specific driver blocks 5 and 9 that incorporate driver electronics and proper bias and impedance matching networks. The transducer 6 is a capacitive micromachined ultrasonic transducer (CMUT) for generating an ultrasonic data signal 15. The ultrasonic data signal 15 may be transmitted through i.e. within a human or animal body, in FIGS. 1 and 2 schematically indicated as water environment 100. The electrostatic transducer 10 is a capacitive coupler for generating an electrostatic data signal 18, for example a body coupled communication (BCC) data signal. The electrostatic data signal 18 may be transmitted across the surface of a human or animal body, in FIGS. 1 and 2 schematically indicated as a medium 200.

Because a CMUT 6 requires large voltage excitations in order to generate a sufficiently large acoustic signal 15, the encoded signal must first be amplified, for example in driver electronics 5. Furthermore, a large bias voltage might need to be applied by driver 5 in order to operate the CMUT 6 device in collapse mode. Finally, the output impedance of this bias and driver block 5 must be carefully designed in order to enable the correct operation of the CMUT 6. The driver block 9 for BCC communication via capacitive coupler 10 may just boost the signal. The impedance matching can be distributed to the input of the driver 9 to guarantee interoperability with driver 5 and the coupler side 10 to facilitate the coupling of signal 18 to the body surface 200. The BCC type of communication allows data communication in proximity of the body surface, i.e. it operates up to a few centimeters (e.g. 10 cm) from the body.

It should be noted that this dual modality realization enables simultaneous transmission, and respectively synchronization, to (between) devices located inside and outside the body. At the same time, because the communication protocol used is half duplex (as explained above), one device at a time can receive only from one other device transmitting in any of the dual modality modes.

On the transmission side, the transmission data is provided to CMUT device 6. This data is amplified by driver electronics 5 before being transmitted via the CMUT device 6. In the experimental setup, the 200 mV peak-peak signal generated by the transmitter 22 of transceiver 3 is amplified by a 50 dB RF amplifier in driver 5. Moreover, in order to have the CMUT device 6 operate in collapse mode, a bias voltage of about 100V is also provided by the driver electronics 5 to the CMUT device. As previously mentioned, the CMUT device 6 may operate in collapse mode in order to generate enough power in the correct frequency bandwidth. Communication could potentially also be achieved if the CMUT device 6 does not operate in collapse mode, however the resonant frequency is then lower than in collapse mode and the low generated acoustic power could complicate desired operation of the communication link. A normal bias-T circuit may implemented in driver electronics 5 in order to simultaneously provide the bias voltage and the AC input voltage to the CMUT device 6.

A block diagram for a receiver layout of communication device 1 is depicted in FIG. 2. The reception chains for ultrasonic and body-coupled signals are identical with the exception of the transducer elements 6 and 10 and the associated impedance matching and biasing electronics in driver blocks 5 and 9 respectively. For example, biasing voltage may be applied to the CMUT device 6, similar as for transmission, in order to guarantee proper operation of the CMUT device 6. The ultrasonic signal 15 picked up by the CMUT device 6 is transformed into an electrical signal, for example by driver electronics 5 of the CMUT 6. The CMUT device 6 may in reception mode be treated as a transducer that has sound input and current output. In reception mode the driver electronics 5 and 9 are not really amplifying the signals from the transducers. Since the signal from CMUT 6 is small, typically a few tens of mV peak-peak, a low noise amplifier (LNA) 27 first amplifies the signal before being decoded. Similarly, any signal received by the capacitive coupler 10 and processed by driver 9 may also be amplified by LNA 27. Depending on the signal coming from the drivers 5 or 9, the LNA 27 can be implemented as voltage, current or trans-impedance amplifier. The signal conditioning chain for the dual modality communication is also illustrated in FIG. 2. The amplified signal is provided to a clock recovery unit 29 and a data correlation circuit 30. The clock recovery unit 29 and data correlation circuit 30 may cooperate with a timing generator 28. The output of the data correlation circuit 30 is then provided to a decoder 32. The received data may thereafter be forwarded to a controller or other circuit (not shown) depicted by output 33.

As described, on the receiver side, the CMUT device 6 transforms the received acoustic signal 15 into an electrical signal, typically a current signal. The transceiver 3 operates in receive mode as illustrated in FIG. 2. Similar to the CMUT device 6 in transmission mode, a bias voltage of about 100V needs to be provided to the CMUT device 6 by driver electronics 5 in order to operate the CMUT 6 in collapse mode to set its sensitivity at the correct frequency range. Thus, a bias-T circuit may be applied in driver electronics 5 in between the CMUT device 6 and the receiver elements 27-32 of transceiver 3. The receiver impedance matching circuitry of driver electronics 9 can be relatively simple and may for example only comprise only a single capacitor in series.

As discussed this implementation of the receiver signal processing chain allows for transmission and receipt of a single signal modality at a time. A simultaneous reception of more signals will require a multiplication of the receivers, for example by using multiple transceivers 3. However, in order to improve the energy efficiency of the created body area network time multiplexed operation is preferred. This is facilitated by the chosen communication principles that allow high data rate transfer. Thus in short time burst many nodes can exchange data.

Further, it is noted that the drivers 5 and 9 in applications of the invention may also comprise switching capability, for example for switching between different modes (transmission, reception) typical for each type of communication. Other elements may be present in the driver electronics 5 and 9 or in the transceiver 3 or any other part of the embodiments of the invention that have not been extensively described herein.

Figure 3:
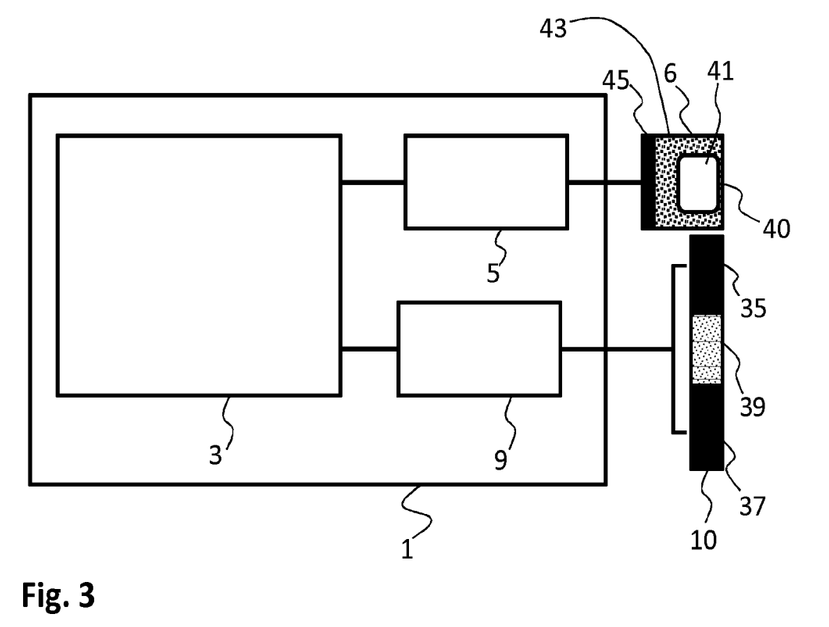
FIG. 3 is a schematic illustration of a communication device of the present invention.

FIG. 3 further illustrates schematically a communication device 1 in accordance with the present invention. In FIG. 3 device 1 comprises a transceiver 3 shared by ultrasonic transducer 6 and electrostatic transducer 10. As in FIGS. 1 and 2, each transducer 6 and 10 comprises its respective associated driver electronics 5 and 9. The CMUT unit 6 comprises a bottom electrode 45 and membrane/electrode 40. In between electrodes 40 and 45, a semiconductor structure 43 may be arranged forming a capacitor and comprising a cavity 41. By applying an AC voltage, including proper biasing voltage, an ultrasonic signal may be generated.

Also illustrated in FIG. 3 is electrostatic transducer 10, which is formed by a horizontal type capacitive coupler 10. It comprises a first electrode 35 and a second electrode 37, in between which there is arranged a dielectric material 39 forming a capacitor. As may be appreciated, the electrostatic transducer 10 may instead or in addition comprise a vertical type capacitive coupler (not shown). In a vertical type capacitive coupler, the electrodes (e.g. electrodes 35 and 37) would be parallel arranged on top of each other having a proper dielectric (e.g. material 39) in between such as to form a sandwich construction. Moreover, there might be a variety of very useful electrode arrangements that may be applied here in various embodiments.

Figure 4:
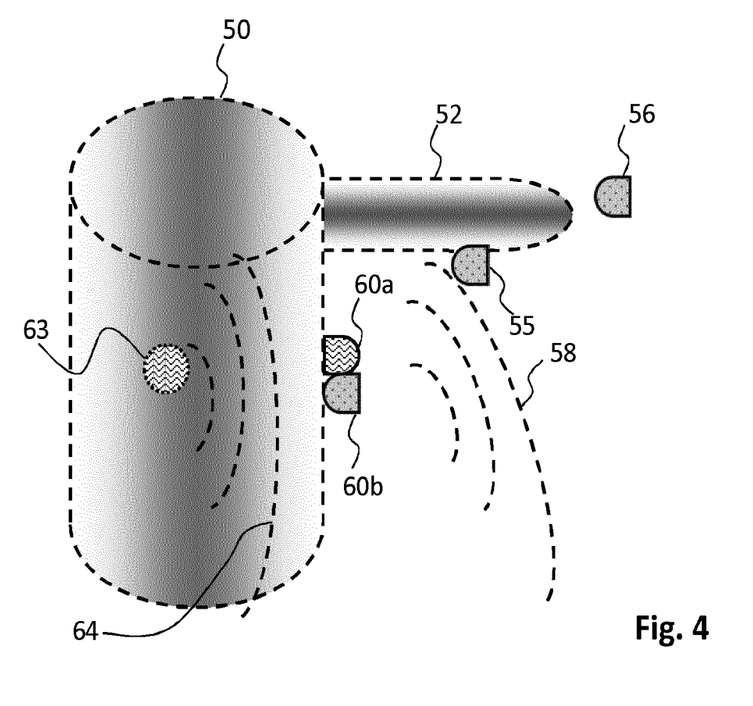
FIG. 4 is a schematic illustration of an application of the invention.
Figure 5:
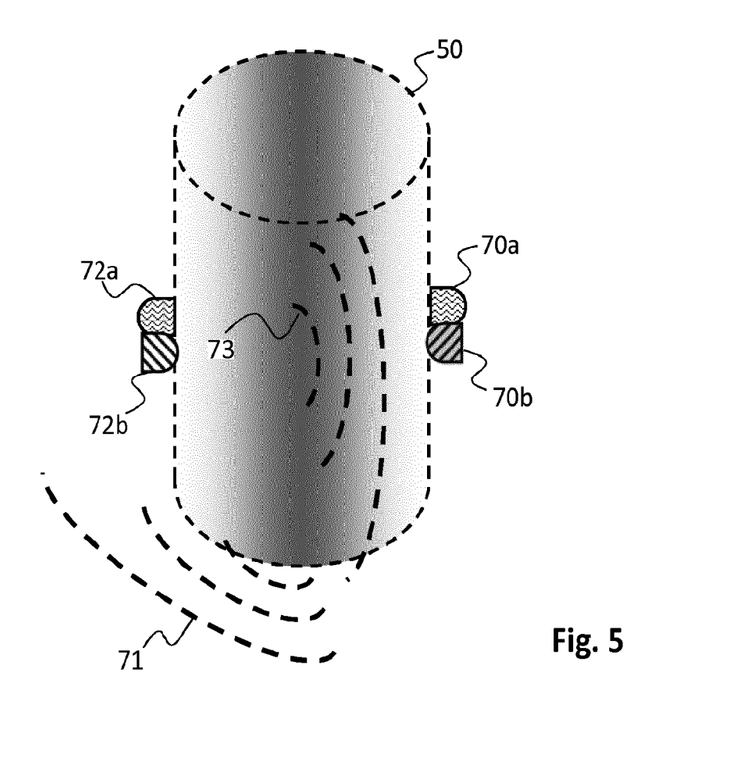
FIG. 5 is a schematic illustration of an application of the invention.

In FIGS. 4 and 5, two application cases for the dual modality communication are illustrated schematically. Both situations differ with respect to the physical location of the communication devices (e.g. 60a/b, 70a/b, 72a/b, and 63, 55 and 56) relative to the communication medium (50, 52). The communication devices (60a/b, 63, 55 and 56) shown in FIG. 4 may single modality communication devices when located inside the body, such as device 63, or when these are only BCC enabled such as smart watch 55 or mobile phone 56. However, wherever this is desired, the communication devices may be dual modality communication devices, such as device 60a/b. Communication device 60a/b may for example be a hub type node 60a/b that seamlessly can link an out of body network via its electrostatic transducer 60b to an in-body network via its ultrasonic transducer 60a. The ultrasonic signal 64 and electrostatic signal 58 is indicated in FIG. 5. This application demonstrates how transplantable devices can be easily connected to wearable or handheld devices. This can facilitate enormously the networking of implantable devices. The node 63 inside the body represents an active transceiver with only an ultrasonic transducer as antenna. In practice the communication nodes can be stand-alone, battery-powered devices or can be attached to catheters and other instruments that allow for insertion.

In addition to the above, instead of using a hub device 60a/b, the dual modality communication device may be part of a wearable or handheld user device as well. The need for only a single transceiver that can be shared between the ultrasonic transducer and the electrostatic transducer, opens the possibility to integrate the technology into a mobile phone for example.

In FIG. 5, devices 70a/b and 72a/b with enabled dual communication modality are located on (and outside) the body. The devices 70a/b and 72a/b may communicate with each other and select which communication modality provides the best propagation properties within its channel. Communication may be across the body surface, e.g. via transducers 70b and 72b, or through the body via transducers 70a and 72a. The ultrasonic signal 73 and electrostatic signal 71 is indicated in FIG. 5. As may be appreciated, additional on-body or in-body communication devices may be present in FIG. 5.

Figure 6A:
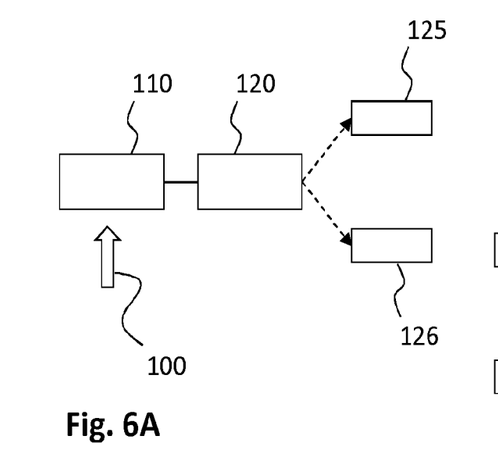
FIGS. 6A and 6B respectively illustrate transmission and receipt using a communication method of the invention.
Figure 6B:
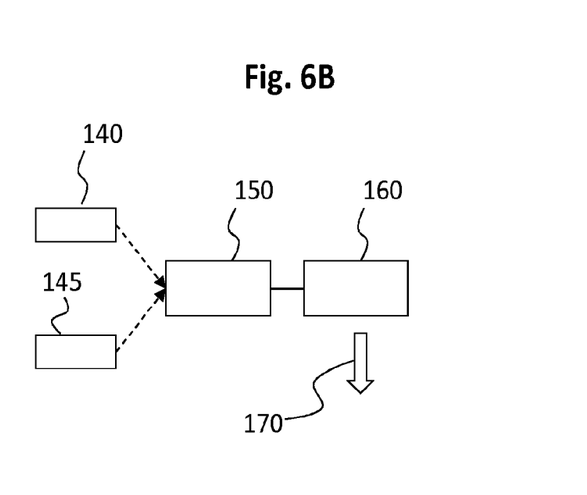

A method of performing data communication between a plurality of devices using a human or animal body as transmission medium is schematically illustrated in FIGS. 6A and 6B. The method in FIG. 6A starts with generating a data signal in step 110 based on data 100 that may be received from a controller or other element in a communication device of the present invention. The data signal in step 110 is generated using a transmitter 22 in a transceiver unit 3 of the communication device 1. Then, in step 120, the it is determined whether the data signal is to be conveyed to another device located in the body (e.g. an implanted device) or a device on or near the body (e.g. wearable or hand held device), and in step 120 the proper transducer (ultrasonic, e.g. CMUT 6, or electrostatic, e.g. BCC coupler 10) is selected. They may also be selected both, in case a data signal is to be provided to different types of devices simultaneously. In steps 125 and 126, the data signal is either transmitted via the CMUT 6 in step 125, or via the BCC type electrostatic transducer (e.g. capacitive coupler) in step 126.

For reception of signals, in FIG. 6B, a data signal is received by either the CMUT 6 in step 140 or the electrostatic transducer 10 in step 145. The receiver of transceiver 3 locks to and processes the data signal in step 150. In step 160—the conveyed data 170 is obtained from the data signal received.

An application example for this usage will be a node located under arms. With this location the BCC will suffer from a bad propagation properties due to shorting of the capacitive field under the arms. This can be solved by switching to ultrasonic link permanently or only by drop-out of the BCC link.

The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. A dual-modality communication device for performing data communication using a human or animal body as transmission medium, the communication device comprising:
   a transceiver comprising at least one a transmitter and one receiver; an electrostatic transducer for enabling the data communication using a body coupled communication protocol via a surface of the body with one or more user devices in touch with or near the body; and an ultrasonic transducer for enabling the data communication through the body using ultrasonic waves, wherein the electrostatic transducer and the ultrasonic transducer are capacitive type transducers connected to and operated via the transceiver.

2. The communication device according to claim 1, wherein the transceiver is configured for communication at a radio frequency within a frequency bandwidth of 100 kHz to 30 MHz.

3. The communication device according to claim 1, wherein the transceiver further comprises at least one encoder cooperating with the transmitter or at least one decoder cooperating with the receiver, wherein the at least one encoder or decoder is configured for encoding or decoding data, respectively, in accordance with a DC-free encoding method.

4. The communication device according to claim 3, wherein the at least one encoder or decoder is configured for encoding or decoding data, respectively, in accordance with a Manchester coding method or a bipolar coding.

5. The communication device according to claim 1, wherein each of the electrostatic transducer and the ultrasonic transducer comprises driver electronics configured for impedance matching or biasing.

6. The communication device according to claim 5, wherein the driver electronics of the ultrasonic transducer is configured for applying a direct current biasing voltage to the ultrasonic transducer for operating the ultrasonic transducer in a collapse mode.

7. The communication device according to claim 1, wherein the ultrasonic transducer is a capacitive micromachined ultrasonic transducer.

8. The communication device according to claim 1, wherein the at least one receiver comprises a low noise amplifier for amplifying signals received from the ultrasonic transducer and the electrostatic transducer.

9. The communication device according to claim 1, wherein the electrostatic transducer comprises at least one capacitive coupler for enabling the data communication using a body couple communication protocol.

10. The communication device according to claim 1, further comprising additional transceivers wherein each of the additional transceivers is connected to the ultrasonic transducer and the electrostatic transducer for enabling simultaneous communication via multiple communication channels.

11. The communication device according to claim 1, wherein the communication device is comprised by at least one in a group consisting of a wearable device, a portable device, and an implantable device.

12. A method for performing data communication between a plurality of devices using a human or animal body as transmission medium, comprising:
providing a first device of the plurality of devices, wherein the first device is located inside the human or animal body;
providing a second device of the plurality of devices, wherein the second device is located on or in proximity of the human or animal body;
using a dual modality communication device for performing the data communication between the plurality of devices;
generating a data signal using a transmitter in a transceiver of the communication device;
transmitting the data signal to the first device or the second device using at least one transducer of a plurality of transducers of the communication device, wherein the plurality of transducers includes an electrostatic transducer and an ultrasonic transducer; and
selecting, by the dual modality communication device, the electrostatic transducer when the data signal is transmitted to the second device using a body coupled communication protocol; and
selecting the ultrasonic transducer when the data signal is transmitted to the first device;
wherein the electrostatic transducer and the ultrasonic transducer are capacitive type transducers that are operated via the transceiver.

13. The method according to claim 12, wherein the transceiver further comprises at least one receiver to which the electrostatic transducer and the ultrasonic transducer are connected, and wherein the method further comprises:
receiving the signal via the electrostatic transducer or the ultrasonic transducer; and
processing the data signal using the at least one receiver for obtaining data conveyed by the data signal.

* * * * *